United States Patent [19]

Miksic et al.

[11] Patent Number: 5,393,457
[45] Date of Patent: Feb. 28, 1995

[54] VAPOR PHASE CORROSION INHIBITOR-DESICCANT MATERIAL

[76] Inventors: Boris A. Miksic, 21 Evergreen Rd., North Oaks, Minn. 55110; Tsi-Zong Tzou, 8826 Summer Wind Cir., Woodbury, Minn. 55125; Joseph M. Foley, 1959 Whtie Bear Ave., Maplewood, Minn. 55109

[21] Appl. No.: 136,959

[22] Filed: Oct. 14, 1993

Related U.S. Application Data

[60] Division of Ser. No. 929,621, Aug. 13, 1992, Pat. No. 5,332,525, which is a continuation-in-part of Ser. No. 905,953, Jun. 29, 1992, Pat. No. 5,209,869, which is a continuation-in-part of Ser. No. 594,357, Sep. 27, 1990, Pat. No. 5,139,700, which is a continuation-in-part of Ser. No. 417,238, Oct. 5, 1989, abandoned, which is a continuation-in-part of Ser. No. 235,120, Aug. 23, 1988, abandoned.

[51] Int. Cl.$^6$ .............................. C23F 11/18
[52] U.S. Cl. .................. 252/194; 106/14.42; 106/14.05; 252/389.54; 252/389.3; 252/392; 252/394; 422/7; 428/461; 428/401; 428/402; 206/204; 206/524.1
[58] Field of Search ............... 252/194, 389.54, 389.3, 252/392, 394; 206/204, 524.1; 428/401, 402, 461; 422/4; 106/14.05, 14.42

[56] References Cited

U.S. PATENT DOCUMENTS

| | | | |
|---|---|---|---|
| 1,995,615 | 3/1935 | Jaeger | 49/398 |
| 2,078,488 | 3/1935 | Farnham | 44/398 |
| 2,156,357 | 5/1939 | Simpson | 422/8 X |
| 2,294,525 | 9/1939 | Waugh | 252/389.5 |
| 2,607,744 | 2/1939 | Viles | 252/389.5 |
| 2,629,649 | 2/1953 | Wachter et al. | 252/392 X |
| 2,848,298 | 8/1958 | Ross et al. | 422/8 |
| 2,898,026 | 8/1959 | Aid | 422/9 X |
| 2,914,424 | 1/1959 | Murray | 427/237 |
| 3,169,116 | 2/1965 | Baseman et al. | 252/394 X |
| 3,282,838 | 11/1966 | Knowles et al. | 252/33.2 |
| 3,356,280 | 12/1969 | Dunholter | 239/57 |
| 3,397,215 | 8/1969 | Hettinger, Jr. | 556/56 |
| 3,425,954 | 2/1969 | Ruzevick et al. | 252/392 |
| 3,433,577 | 3/1969 | Shick | 252/387 X |
| 3,539,605 | 11/1970 | Oberhofer | 556/57 |
| 3,573,225 | 3/1971 | Kondo et al. | 252/390 |
| 3,749,598 | 3/1975 | Kushima et al. | 428/341 |
| 3,887,481 | 6/1975 | Korpics | 252/172 |
| 3,936,560 | 2/1976 | Santurri et al. | 252/390 X |
| 3,967,926 | 7/1976 | Rozenfeld et al. | 422/9 |

(List continued on next page.)

FOREIGN PATENT DOCUMENTS 131971 1/1946 Australia .
1800001 4/1970 Germany .

OTHER PUBLICATIONS

"The $105 Billion Corrosion Problem," 1984 The Cortec Corporation.
Wachter, et al., "Dicyclohexylammonium Nitrite, A Volatile Inhibitor for Corrosion Preventive Packaging," Corrosion National Association of Corrosion Engineers, Sep. 1951, pp. 284–294.

*Primary Examiner*—Robert L. Stoll
*Assistant Examiner*—Valerie Fee
*Attorney, Agent, or Firm*—Haugen and Nikolai

[57] ABSTRACT

A vapor phase corrosion inhibitor-desiccant composite comprising silica gel granules coated with a vapor phase corrosion inhibitor component. The corrosion inhibitor component is selected from a formulation comprising anhydrous molybdates such as ammonium dimolybdate, sodium molybdate and amine molybdates mixed with benzotriazole and sodium nitrate, or from a formulation comprising amine benzoates, amine nitrates and benzotriazole. The composites can be impregnated into foam, extruded with polyolefin films which can additionally be laminated with metallized second film, or encapsulated in an air-permeable container. The corrosion inhibitor formulations have vapor pressures which provide ongoing corrosion protection for susceptible articles situated favorably with respect to the composite.

13 Claims, 1 Drawing Sheet

U.S. PATENT DOCUMENTS

| | | | |
|---|---|---|---|
| 3,990,872 | 11/1976 | Cullen | 55/274 |
| 4,040,798 | 8/1977 | Kuhn et al. | 252/392 |
| 4,051,066 | 9/1977 | Miksic et al. | 252/389.5 |
| 4,053,455 | 10/1977 | Kroenke | 524/97 |
| 4,116,701 | 9/1978 | Conner, Sr. | 252/394 X |
| 4,124,549 | 11/1978 | Hashiudo et al. | 252/389.2 X |
| 4,218,385 | 8/1980 | Pike | 252/389.5 |
| 4,275,835 | 6/1981 | Miksic et al. | 252/390 X |
| 4,308,168 | 12/1981 | Sato et al. | 252/389.61 |
| 4,321,060 | 3/1982 | Sung et al. | 252/302 X |
| 4,321,297 | 3/1982 | Adelman | 428/235 |
| 4,338,209 | 7/1982 | Manabe et al. | 252/389.2 X |
| 4,370,388 | 1/1983 | Mito et al. | 428/461 |
| 4,406,837 | 9/1983 | Kroenke | 556/57 |
| 4,419,105 | 3/1982 | Sung | 252/392 X |
| 4,453,786 | 6/1984 | Landell | 312/31.1 |
| 4,668,774 | 5/1987 | Loeffler et al. | 534/728 |
| 4,939,014 | 7/1990 | Anderson et al. | 528/76 |
| 4,973,448 | 11/1990 | Carlson et al. | 422/9 |

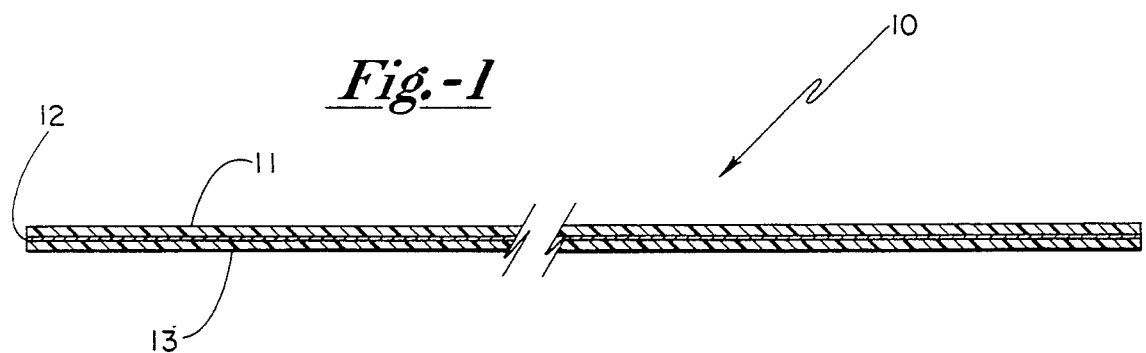
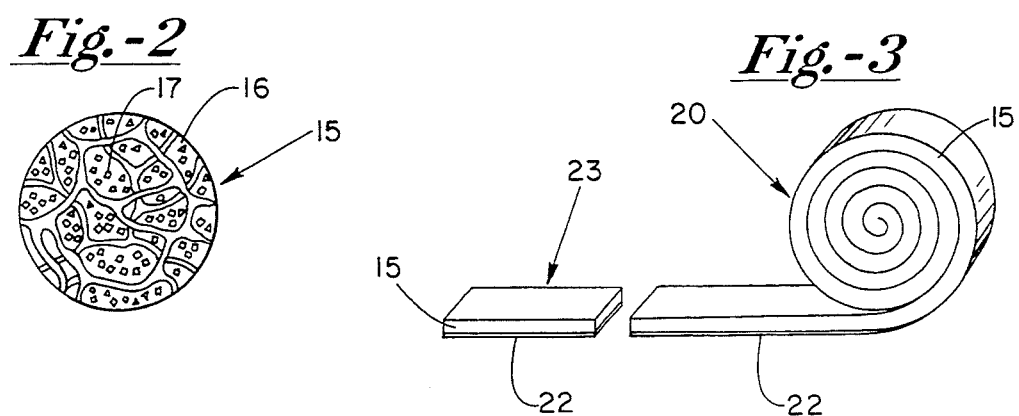
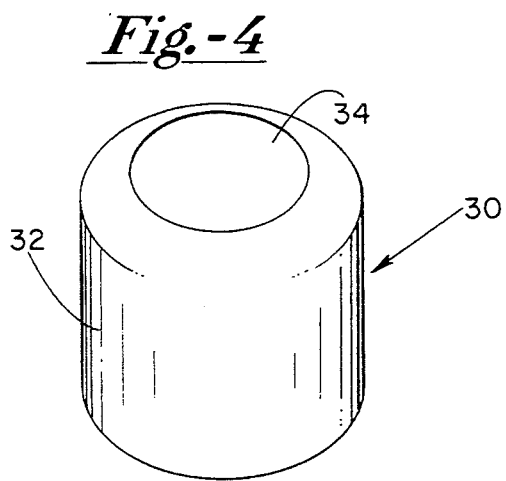

VAPOR PHASE CORROSION INHIBITOR-DESICCANT MATERIAL

CROSS-REFERENCE TO RELATED APPLICATIONS

This is a divisional of co-pending application Ser. No. 07/929,621, filed on Aug. 13, 1992, now U.S. Pat. No. 5,332,525, which is a continuation-in-part of our co-pending application Ser. No. 905,953, filed Jun. 29, 1992, now U.S. Pat. No. 5,209,869 which in turn was a continuation-in-part of our co-pending application Ser. No. 07/594,357, filed Sep. 27, 1990, allowed Apr. 3, 1992 now U.S. Pat. No. 5,139,700 and entitled "VAPOR PHASE CORROSION INHIBITOR MATERIAL", which in turn, was a continuation-in-part of our co-pending application Ser. No. 07/417,238, filed Oct. 5, 1989, entitled "VAPOR PHASE CORROSION INHIBITOR MATERIAL", now abandoned, which in turn was a continuation-in-part of application Ser. No. 07/235,120, filed Aug. 23, 1988, entitled "VAPOR PHASE CORROSION INHIBITOR MATERIAL", now abandoned

FIELD OF THE INVENTION

The present invention relates to a formulation which is particularly adapted for use as a vapor phase corrosion inhibitor-desiccant, the material being useful for either inhibiting the corrosion of the metallic items and/or passivating the surfaces thereof, the formulation being particularly adapted for direct incorporation within foam by impregnation therein or within synthetic resinous films through extrusion or deposition into a film, such as into an olefinic film, polyethylene, or the like. Film products prepared in accordance with the present invention find particular application in the formation of enclosures about metallic articles susceptible to corrosion, and provide a relatively dry corrosion inhibiting atmosphere therewithin. Air-permeable capsules and impregnated foam products prepared in accordance with the invention find application in their placement at the site of the items to be protected.

Specifically, the compositions of the present invention comprise a vapor phase corrosion inhibitor-desiccant wherein the vapor phase corrosion inhibitor component is selected from the group consisting of anhydrous sodium molybdate and mixtures of such molybdates with sodium nitrite and benzotriazole, and mixtures of benzoates of amine salts with benzotriazole and nitrates of amine salts. The desiccant component of the composition is a solid-phase granular particle consisting essentially of silica gel onto which the vapor phase corrosion inhibitor component, in powdered form, has been deposited thereon. These compositions provide a vapor phase corrosion inhibitor-desiccant which may be extruded along with a film material, with the film thereafter being utilized to form an enclosure housing the item or items being protected. Alternatively, the compositions may be placed within enclosures or packages containing items which are to be protected from corrosion. One manner in which this approach is effective is to provide an air-permeable capsule or other similar container containing the compositions therein. Of course, the capsule or other container must have sufficient permeability so that the components of the corrosion inhibitor-desiccant therein can enter the ambient environment of the items to be protected. A second manner in which the corrosion inhibitor-desiccant compositions can be placed within enclosures or packages containing items to be protected is to impregnate foam with the compositions and then place the foam in proximity to the items.

For most purposes, anhydrous powdered or finely divided mixtures of certain molybdates including anhydrous sodium molybdate, ammonium dimolybdate and amine molybdates along with mixtures of such molybdates with sodium nitrite and benzotriazole and mixtures of amine benzoates with amine nitrates and benzotriazole are preferred. These materials are then deposited upon the larger silica gel granules, with such vapor phase corrosion inhibitor components being preferred for such deposition applications. This composite mixture is preferably extruded into polyethylene film at a concentration of from between about 2% and 3% by weight. It is preferably impregnated into foam at a concentration of from between about 1% and 30% by weight. Preferably, the silica gel particulate material has an average particle size ranging from between about 2 $\mu$m and 8 $\mu$m, with the vapor phase corrosion inhibitor component deposited on the surface of the granules having a size ranging from between about 0.001 micron and 0.1 micron.

As an added feature of the invention, film materials extruded with the formulations of the present invention may, in turn, be laminated to a second metallized film, such as, for example, metallized polyethylene terephthalate. The combined laminate provides a means to reduce and/or eliminate static build-up in or along the film, and accordingly improves the properties of the film when employed as an enclosure.

BACKGROUND OF THE INVENTION

In commerce and industry today, the useful life of corrodible items may be extended and/or preserved by providing corrosion inhibitors which protect the corrodible item from the adverse effects of its ambient environment. Corrosion inhibitors, particularly vapor phase corrosion inhibitors, have been found useful in protecting certain corrodible items against reaction with elements or compounds which may be found within their environment, and thereby losing their effectiveness, reducing their useful life, or otherwise diminishing their value. Such protection is typically needed during times of packaging, handling, shipment, or during end use. Elements or compounds which are normally of primary concern are gases such as oxygen, water vapor, sulfides, carbon dioxide, and the like. The vapor phase corrosion inhibitor-desiccant formulations of the present invention find particular application in the preparation of packaging material and in the preparation of formulation-impregnated foam. Packaging material is produced through in-situ extrusion of the material with films, with the films thereafter being utilized to form an envelope or other enclosure about the article being protected. The films may also be employed as a member of a multi-layer laminate including a metallized film having good tear resistant properties such as stress-oriented polyethylene terephthalate containing a vapor deposited film or layer of metallic aluminum on a surface thereof. Such films are commercially available and are commonly designated as "aluminized" films. Foam impregnation is accomplished by liquid dispersion, as known in the art, of the formulations into the foam, followed by controlled evaporation of the liquid carrier to thereby deposit the formulations in the cellular interstices of the foam. The resultant product can be placed in proximity to items to be protected, with such protection occurring as the corrosion inhibitor-desiccant is released from the foam.

Among the common indications of corrosion manifested in useful metallic articles are oxidation, pitting, tarnishing, mottling, or discoloration of the surfaces of these items. These manifestations occur in the articles, particularly when exposed to oxygen and in either gaseous or liquid phase. Additionally, sulfides may present corrosion or tarnishing problems as well. Inasmuch as both oxygen and water, including water vapor, occur normally and are available in nature, it is normally necessary to take precautions against corrosion when packaging metallic items for shipment or storage, or when subjecting such items to normal use. Metals which are frequently found to be susceptible to corrosion under normal atmospheric and ambient conditions are iron, copper, brass, aluminum, silver, and alloys of these metals. The formulations of the present invention are particularly useful in providing protection to both ferrous and non-ferrous metals, including such non-ferrous metals as aluminum, copper and brass. Care must frequently be taken to protect articles fabricated from such metals, even when their surfaces have been treated so as to be provided with sacrificial or aesthetic coatings of zinc or cadmium on their surfaces. Such sacrificial or aesthetic coatings are, of course, in wide use, but restrictions of use of these materials may appear from time to time due to their potential contribution to pollution or the like. Accordingly, means must be provided to find alternate techniques for the protection and/or preservation of metallic articles.

In the past, it has been known to provide a package or other enclosure which includes one or more inhibiting compounds along with the corrodible item or items to be protected. Additionally, articles have been protected by means of utilization of protective coatings in the form of solids, liquids, greases, or pastes, however such coatings tend to be temporary in nature and further present certain disadvantages to normal handling and packaging. Furthermore, removal of such protective coatings may present problems either due to incomplete removal, or the costs of such removal. The composite vapor phase corrosion inhibitor-desiccant materials of the present invention find application as a solid phase composite which may be impregnated into foam or be co-extruded with film which is to form an enclosure about an article being protected.

Solid phase and liquid phase compounds have been used in the past to provide a source of vapor phase corrosion inhibitors. These materials typically undergo either evaporation or sublimation so as to provide the substantially constant availability of the inhibitors. In other words, vapor phase corrosion inhibitors typically emit vapors which protect corrodible surfaces through the deposition or condensation of a protective film or coating upon the surface. In order to be assured that a constant supply of inhibitor be present, adequate quantities of the solid phase or liquid phase corrosion inhibiting compounds must be provided, with the corrosion inhibiting compounds being released at or adjacent the location where needed.

Granular silica gel is widely available for use as a desiccant. Frequently, granular silica gel is placed within a woven or knit pouch and placed within the confines of a package or enclosure for enveloping a corrosion-susceptible article. The granular material, when maintained at a particle size of below about 8 $\mu$m may be utilized as a solid-phase substrate upon which powdered vapor phase corrosion inhibitor materials may be deposited.

When a laminate is formed in which one layer comprises a heat sealable film such as polyethylene with composite compositions of the present invention extruded in-situ, and with a second film layer being a material such as metallized stress-oriented polyethylene terephthalate films with desirable combinations of properties are achieved. Specifically, the polyethylene film layer retains its conventional heat sealing properties, while the stress-oriented polyethylene terephthalate provides a tear-resistant property. The metallized layer is utilized to reduce and/or eliminate static build-up, thereby further enhancing the properties and qualities of the laminate. Stress-oriented polyethylene terephthalate is normally biaxially oriented, and is, of course, commercially available. The composite vapor phase corrosion inhibiting/desiccant materials of the present invention enhance the protective qualities of films which incorporate or otherwise include the composite materials.

SUMMARY OF THE INVENTION

In accordance with the present invention, a solid phase material has been found which provides a source of vapor phase corrosion inhibiting material along with a substrate of granular silica gel. The vapor pressure of the composite material is balanced with the quantities normally required to be emitted for effective and long term protection of the metallic surfaces being exposed for treatment. The formulations of the present invention provide for emission of vapors in a concentration which is appropriate for strong protection of the metallic surfaces, and yet at a rate sufficiently low so as to provide for relatively long-lasting and long-term effective economic treatment. The presence of granular silica gel as a substrate for the vapor phase corrosion inhibiting component has been found to enhance the protective qualities of the product. The formulations of the present invention are compatible with and may be impregnated into foam such as an isocyanate-derived polymer foam, or extruded or otherwise deposited with synthetic resinous films, such as aliphatic hydrocarbon or olefinic films such as polyethylene and polypropylene. Such films may be incorporated with other films in a laminate, and in particular may be combined with a metallized film so as to enhance the static elimination and mechanical properties of the composite.

Additionally, the vapor phase corrosion inhibitor-desiccant composites of the present invention have been found to produce little, if any, visible residue. The lack of residue enhances the utility of the materials, inasmuch as little, if any, mechanical or electrical problems result from the continuous use of these materials. Additionally, when granular silica gel component is used as a substrate for the corrosion inhibitor component, smoke and fume evolution of the corrosion inhibitor component is greatly reduced.

Typical corrosion inhibiting articles and materials used in the past are disclosed in Miksic et. al. U.S. Pat. No. 4,051,066 and Miksic et. al. U.S. Pat. No. 4,275,835.

The composite formulations of the present invention have been found to be particularly well adapted to be housed in an air-permeable capsule for placement with an item to be protected, to be impregnated into foam, or to be combined as an extrudate with films fabricated from aliphatic hydrocarbon such as polyethylene and polypropylene. For facilitating impregnation or extrusion operations, composites consisting of powdered anhydrous molybdates such as ammonium dimolybdate, sodium molybdate and amine molybdates mixed with benzotriazole and sodium nitrate or amine benzoates mixed with amine nitrates and benzotriazole are deposited upon granular silica gel particles. These composites are, in turn, impregnated into the foam or co-extruded with appropriate film-forming materials. Generally speaking, the formulations of the present invention are utilized for retention and/or packaging within modestly porous envelopes or other enclosures formed of plastic film or plastic foam. Typically, those certain enclosures disclosed and claimed in the Miksic et. al. U.S. Pat. Nos. 4,051,066 and 4,275,835, as identified hereinabove, are well adapted for use with the formulations or compounds of the present invention. Also, when extruded with a heat sealable film such as polyethylene, a metallized (aluminized) layer such as biaxially stress-oriented polyethylene terephthalate may be employed to enhance the mechanical properties of the overall film arrangement. Techniques for laminating these films together are, of course, well known in the art.

In accordance with the present invention, the vapor phase corrosion inhibitor components comprising molybdates which have been found particularly desirable for use in combination with metallic surfaces susceptible to corrosion comprise anhydrous sodium molybdate [$Na_2MoO_4$], anhydrous ammonium dimolybdate [$(NH_4)_2MoO_4$], or an anhydrous amine-molybdate having the general structural formula:

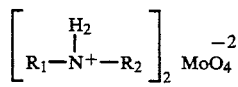

wherein $R_1$ is an aliphatic hydrocarbon having up to 7 carbon atoms, and wherein $R_2$ is either hydrogen or an aliphatic hydrocarbon having up to 7 carbon atoms. The preferred amine molybdates of this component of the composites of the present invention are amine-molybdates derived from the group consisting of dicyclohexylamine, 2-ethylhexylamine, and cyclohexylamine. Such molybdates are readily synthesized and can be prepared in anhydrous form without requiring unusual processing or handling problems. As indicated above, these molybdates are utilized in anhydrous form when provided in a permeable capsule, impregnated into a foam, or extruded with a film, and are employed in a mixture in combination with sodium nitrite and benzotriazole. Alternatively, anhydrous sodium molybdate and ammonium dimolybdate may be utilized in combination with sodium nitrite and benzotriazole. A second group of components also having particularly desirable utility as vapor phase corrosion inhibitor components is a mixture comprising amine benzoates, amine nitrates and benzotriazole. A preferred composition comprises cyclohexylamine benzoate, ethylamine benzoate, dicyclohexylamine nitrate and benzotriazole. In use, these materials provide a highly desirable balance between continuous emission from the solid phase, with this emission being at a rate sufficiently low so as to provide for relatively effective long-term and economic protection and treatment.

The granular silica gel component of the present invention preferably has a particle size range of less than about 8 μm. Such granular silica gel is, of course, widely commercially available and as indicated above, provides a solid phase substrate for the vapor phase corrosion inhibitor component.

It is therefore a primary object of the present invention to provide an improved vapor phase corrosion inhibitor-desiccant which is particularly adapted for use in the protection of metallic surfaces exposed to environments which are corrosive to the exposed surfaces.

It is a further object of the present invention to provide an improved vapor phase corrosion inhibitor-desiccant which is formulated so as to possess a vapor pressure or other property which allows transport of the inhibitor to the metal surface appropriate for transport of appropriate quantities of the inhibitor from solid phase in the film to the metal surface, with the balance of the inhibitor being retained in the film, to provide a continuous supply of emitted corrosion inhibiting material.

It is yet a further object of the present invention to provide an improved vapor phase corrosion inhibitor-desiccant composite which is formulated so as to be capable of impregnation into a foam or extrusion with conventional aliphatic hydrocarbon resinous films such as polyethylene, polypropylene, and the like.

It is still a further object of the present invention to provide an improved vapor phase corrosion inhibitor-desiccant composite which is formulated so as to be capable of extrusion with conventional heat sealable films such as polyethylene, with such polyethylene films being, in turn, laminated to a metallized second film so as to enhance mechanical properties as well as static elimination properties of the composite laminate.

Another object of the present invention is to provide a foam product impregnated with the vapor phase corrosion inhibitor-desiccant material here described.

Yet another object of the present invention is to provide an air-permeable capsule containing the vapor phase corrosion inhibitor-desiccant material of the present invention for placement in the proximity of an item to be protected.

Other and further objects of the present invention will become apparent to those skilled in the art upon a study of the following specification, appended claims, and accompanying drawing.

BRIEF DESCRIPTION OF THE DRAWINGS

FIG. 1 is a cross-sectional view of a typical laminate prepared in accordance with the present invention, with the center or metallized layer being shown in somewhat exaggerated form due to limitations of draftsmanship;

FIG. 2 is an enlarged cross-section of an open cell foam within which a corrosion inhibitor-desiccant formulation is impregnated;

FIG. 3 is a roll or coil of the foam of FIG. 2; and

FIG. 4 is an air-permeable capsule in which a corrosion inhibitor-desiccant formulation is housed.

DETAILED DESCRIPTION OF THE PREFERRED EMBODIMENT

In accordance with the preferred embodiment of the present invention, a particularly useful vapor phase corrosion inhibitor component for the composite material to be supplied in an air-permeable capsule, incorporated with foam, or extruded polyethylene film includes a mixture of either anhydrous sodium molybdate, anhydrous ammonium dimolybdate, or amine molybdates, together with sodium nitrite and benzotriazole. Specifically, in a particularly preferred embodiment, a mixture is provided in the following formulation:

| Component | Percent by Weight |
|---|---|
| Anhydrous sodium molybdate | about 70% |
| sodium nitrite | about 25% |
| Benzotriazole | about 5% |

This mixture is particularly effective when prepared in powdered form having a particle size below about 1 micron, and deposited upon granular silica gel. The relative weight ratios are preferably from between about 45% vapor phase corrosion inhibitor component, balance silica gel, although ratios of from between about 30% and 50% vapor phase corrosion inhibitor component, balance silica gel may be employed. The composite material is impregnated into foam at a concentration of from about 1% to about 30% by weight. It is extruded into polyethylene film at a concentration of from about 2% to about 3% by weight.

In the formulation provided above, the useful range of the components present in the vapor phase corrosion inhibiting constituent may be set forth as follows:

| Component | Percent by Weight |
|---|---|
| Anhydrous sodium molybdate | about 65%–about 75% |
| Sodium nitrite | about 22%–about 28% |
| Benzotriazole | about 4%–about 6% |

These ranges may be found useful for certain applications.

A second particularity useful vapor phase corrosion inhibitor component for the composite material comprises a mixture of amine benzoates, amine nitrates and benzotriazole. Specifically, the following formulation provides a particularly preferred embodiment:

| Component | Percent by Weight |
|---|---|
| Cyclohexylamine benzoate | about 68% |
| Ethylamine benzoate | about 10% |
| Dicyclohexylamine nitrate | about 20% |
| Benzotriazole | about 2% |

This mixture, also in powdered form and having a particle size below about 1 micron, is deposited upon granular silica gel, with relative weight ratios the same as recited above for the formulations containing molybdates. Likewise, its impregnation into foam or extrusion into film is at the same concentration as stated for the molybdate formulations. The useful range of the preferred formulation shown above is as follows:

| Component | Percent by Weight |
|---|---|
| Cyclohexylamine benzoate | about 50%–about 97% |
| Ethylamine benzoate | about 1%–about 20% |
| Dicyclohexylamine nitrate | about 1%–about 20% |
| Benzotriazole | about 1%–about 10% |

Preparation of compositions containing these components are prepared by simply blending the individual powdered components together.

While there are various techniques that may be employed for providing an appropriate extrudate including, for example, polyethylene and a vapor phase corrosion inhibitor-desiccant of the type described herein, one particular technique has been found to be particularly useful. Specifically, the composite formulation is formed and rendered as uniform in particle size and configuration as possible. This composite is then combined with a relatively limited quantity of polyethylene with the mixture then being passed through the barrel of a conventional extruder to form a master batch. The resultant master batch is then chopped and rendered into pellet form. These pellets are, in turn, combined with additional polyethylene and then extruded as the film containing a vapor phase corrosion inhibitor-desiccant of the type described.

Preparation of a foam-impregnated product is accomplished by dispensing a corrosion inhibitor-desiccant formulation of the present invention in a liquid carrier in which the foam is then immersed. The formulation becomes dispensed throughout the foam structure during immersion, and is there retained upon removal of the foam from the liquid carrier. Subsequent evaporation of the carrier is effectuated to thereby yield the impregnated foam product. An adhesive backing can be applied to the foam product to permit convenient placement and retention of the product at the site of needed protection.

A preferred air-permeable capsule product is constructed of a plastic vessel containing a corrosion inhibitor-desiccant formulation of the present invention and having an opening which is covered by an air-permeable Tyvek membrane (manufactured by Du Pont Co., Wilmington, Del.) through which emission of the formulation can occur.

In order to describe alternate materials useful in connection with the present invention, the synthesis of three amine-molybdate compounds will be described hereinbelow, it being understood that each resultant compound possesses appropriate physical and chemical properties in its anhydrous form so as to be highly useful in connection with the various aspects of the present invention.

The aliphatic amines employed are from the group consisting of dicyclohexylamine, 2-ethylhexylamine, and cyclohexylamine, it being understood that other aliphatic amines within this general category may be found useful as well.

AMINE-MOLYBDATE "A"

Pursuant to this embodiment, dicyclohexylamine having a molecular weight of 181.36 and the empirical formula $C_{12}H_{23}N$ is employed. The method and procedure set forth in Example I hereinbelow is followed.

EXAMPLE I

A formulation is prepared with the following components:

| Component | Percent by Weight |
|---|---|
| Dicyclohexylamine | 10% |
| Phosphoric acid | 4% |
| Water | 36% |
| Aqueous solution of ammonium molybdate (20%) | 50%. |

The 20% ammonium molybdate solution is prepared by adding pure molybdenum trioxide to a 5% aqueous solution of ammonium hydroxide. The pH of the resulting solution is normally in the range of 7.5 to 8.5. The dicyclohexylamine, phosphoric acid and water are mixed together to form a neutral to slightly alkaline solution, the pH being in the range of 7.5 to 8.5. The 20% aqueous solution of ammonium molybdate is then added. The reaction that occurs is a simple displacement reaction in which a white powdery precipitate is formed upon addition of the ammonium molybdate solution. Following the completion of the reaction, the mixture is cooled to approximately 60° F., after which the precipitate is filtered, washed, and dried until the anhydrous form is obtained. The anhydrous finished product is a fine white powder having the following structural formula:

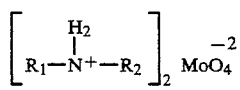

wherein $R_1$ and $R_2$ are cyclohexyl radicals.

AMINE-MOLYBDATE "B"

Pursuant to this embodiment, 2-ethylhexylamine having a molecular weight of 129.2 and the empirical formula $C_8H_{19}N$ is employed. The method and procedure set forth in Example II hereinbelow is followed.

EXAMPLE II

A formulation is prepared with the following components:

| Component | Percent by Weight |
| --- | --- |
| 2-ethylhexylamine | 5% |
| Phosphoric acid | 2.5% |
| Water | 67.5% |
| Aqueous solution of ammonium molybdate (20%) | 25%. |

The 20% ammonium molybdate solution is prepared as set forth in Example I hereinabove. The 2-ethylhexylamine, phosphoric acid and water are mixed together to form a neutral to slightly alkaline solution, the pH being in the range of 7.5 to 8.5. The 20% aqueous solution of ammonium molybdate is then added. The reaction that occurs is a simple displacement reaction in which a white powdery precipitate is formed upon addition of the ammonium molybdate solution. Following the completion of the reaction, the mixture is cooled to approximately 60° F., after which the precipitate is filtered, washed, and dried until the anhydrous form is obtained. The anhydrous finished product is a fine white powder having the following structural formula:

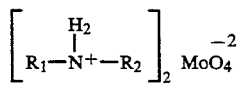

wherein $R_1$ is a 2-ethylhexyl radical and $R_2$ is hydrogen.

AMINE-MOLYBDATE "C"

Pursuant to this embodiment, cyclohexylamine is employed in the preparation of cyclohexylamine-molybdate. Cyclohexylamine having a molecular weight of 99.17 and the empirical formula $C_6H_{11}NH_2$ is employed. The method and procedure set forth in Example III hereinbelow is followed.

EXAMPLE III

A formulation is prepared with the following components:

| Component | Percent by Weight |
| --- | --- |
| Cyclohexylamine | 20% |
| Molybdenum trioxide (pure) | 13% |
| Water | 67%. |

The water, molybdenum trioxide and cyclohexylamine are mixed together all at once. While mixing, the solution is heated to approximately 175° F. When the solution becomes clear, the mixture is cooled to 60°-70° F., whereupon a grey-white precipitate forms. The precipitate is filtered, washed and dried until the anhydrous form is obtained. The anhydrous finished product is a white crystalline powder with the following structural formula:

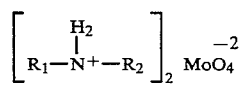

wherein $R_1$ is a cyclohexyl radical and wherein $R_2$ is hydrogen.

The amine-molybdates as set forth above are, of course, employed in anhydrous form with the silica gel substrate. It has been found that such molybdates, when employed in anhydrous form and deposited onto granular silica gel will be readily incorporated into a foam or into olefinic films such as polyethylene and polypropylene. Effective mixtures of the amine-molybdate components are normally formulated utilizing 70% by weight anhydrous amine-molybdate of the type shown in Examples I, II and III above, 25% sodium nitrite and 5% benzotriazole. As indicated in connection with such formulations discussed above utilizing anhydrous sodium molybdate, these formulations incorporate amine-molybdates A, B or C, are impregnated into foam at a concentration of from about 1% to about 30% by weight or extruded into polyethylene film at a concentration of between 2% and 3% by weight.

In accordance with the examples, the aliphatic amine may be present in an amount ranging from between about 5% and 20%. In the interests of completeness of the reaction involved, it has been found that approximately 10% by weight of the aliphatic amine produces a desirable end product. The reactions involved occur quite rapidly and have been found to go substantially to completion at room temperature.

While dicyclohexylamine, 2-ethylhexylamine, and cyclohexylamine have been indicated as the most desirable materials, it will, of course, be appreciated that certain conditions of end use along with certain other considerations and parameters may dictate that somewhat smaller aliphatic chain lengths be employed. For example, use of the material in somewhat cooler environments may render it desirable to utilize materials having a somewhat shorter chain length in order to achieve an appropriate degree of sublimation while exposed to ambience. Other considerations may indicate utilization of such shorter chain lengths, as well.

As has been indicated hereinabove, and with attention being directed to FIG. 1 of the drawing, the vapor phase corrosion inhibitor-desiccant composite materials of the present invention are well adapted for extrusion with resinous film material typically employed in the packaging industry. When employed as a member or layer of a laminate, and with continued attention being directed to the drawing, the film generally designated 10 includes a first layer of plastic film 11 having a metallic or metallizing layer 12 deposited thereon. Layer 13 of laminate 10 is impregnated with the composite compositions of the present invention, with the solid particles being introduced into the film through co-extrusion techniques. For example, the amine-molybdate of Example I is prepared, and deposited as a fine white powder onto silica gel to form a composite. The composite is introduced into conventional polyethylene film. This impregnated film is, in turn, laminated to the metallized layer 12 of film 11 so as to form the ultimate composite. Laminating techniques for such films are, of course, well known in the art. Metallized films of biaxially oriented polyethylene terephthalate are readily bonded to and laminated with polyethylene films of the type shown at 13. In like manner, the amine-benzoate composition earlier described is deposited onto silica gel to form a composite which is then introduced into film.

FIG. 2 is an cross-section of foam 15 which is impregnated with a corrosion inhibitor-desiccant formulation of the present invention. The foam 15 is an open-cell isocyanate-derived polymer as known in the art. Retained within the cells 16 are discreet particles 17 of the inhibitor-desiccant formulation. These particles 17 are distributed within the foam by immersing the foam in a liquid in which the inhibitor-desiccant formulation is dispersed. The immersed foam 15 behaves much like a sponge in soaking up the loaded liquid to thereby achieve deposition of the inhibitor-desiccant formulation therewithin. Evaporation of the liquid results in impregnation of the formulation by particles 17. The impregnated foam 15 can be supplied in a roll or coil form 20 as shown in FIG. 3, and can be provided with an adhesive backing 22 for adhered retention at a site. A section 23 has been cut from the roll.

Providing the corrosion inhibitor-desiccant formulation of the present invention is a permeable capsule 30 as shown in FIG. 4 permits placement of the capsule in proximity to items to be protected. The body 32 of the capsule 30 is constructed of plastic, while a cover 34 is made of Tyvek ®, a polymer having permeability characteristics which permit emission of corrosion inhibitor for deposition on items to be protected.

Vapor phase corrosion inhibitor-desiccant composites of the present invention are also well adapted for retention and/or packaging within modestly porous envelopes or other enclosures. These envelopes may be formed of plastic film or plastic foam, or alternatively, may be fabricated from cellulosic products such as paper or the like. In addition to being retained and/or packaged within envelopes or enclosures, the material may be placed upon or within an appropriate substrate formed of synthetic resin, foam or cellulosic materials. Typical examples of useful material include polyethylene, polypropylene, polymer foams, paper, and the like. When paper is employed, it is preferred that the drying operation be undertaken so as to provide reasonably anhydrous amine-molybdate materials.

It will be appreciated, therefore, that examples provided herein are for purposes of illustration only and are not to be regarded as a restriction upon the scope of the claims, inasmuch as those skilled in the art may depart from these specific examples without actually departing from the spirit and scope of the present invention.

What is claimed is:

1. A vapor phase corrosion inhibitor-desiccant formulation and substrate composite comprising:
   (a) a vapor phase corrosion inhibitor component comprising, by weight, from about 22% to about 28% sodium nitrite, from about 4% to about 6% benzotriazole, and an anhydrous molybdate selected from the group consisting of sodium molybdate, ammonium dimolybdate, amine molybdates, and mixtures thereof;
   (b) a desiccant component comprising a granular silica gel having a particle size between about 2 $\mu$m and about 8 $\mu$m and upon whose surface the inhibitor component is deposited to thereby produce a vapor phase corrosion inhibitor-desiccant formulation; and
   (c) a substrate wherein the inhibitor-desiccant formulation is retained.

2. A vapor phase corrosion inhibitor-desiccant formulation and substrate composite as claimed in claim 1 wherein the substrate comprises a foam.

3. A vapor phase corrosion inhibitor-desiccant formulation and substrate composite as claimed in claim 2 wherein the inhibitor-desiccant formulation is present in the range of from about 1% to about 30% by weight.

4. A vapor phase corrosion inhibitor-desiccant formulation and substrate composite as claimed in claim 1 wherein the substrate comprises an aliphatic hydrocarbon film selected from the group consisting of polyethylene and polypropylene, and wherein the inhibitor-desiccant formulation is retained within the substrate by extrusion therewith.

5. A vapor phase corrosion inhibitor-desiccant formulation and substrate composite as claimed in claim 4 wherein the inhibitor-desiccant formulation is present in the range of from about 2% to about 3% by weight.

6. A vapor phase corrosion inhibitor-desiccant formulation and substrate composite comprising:
   (a) a vapor phase corrosion inhibitor component consisting essentially of a substantially anhydrous amine molybdate having the following structural formula:

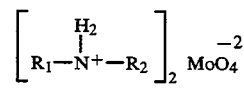

wherein $R_1$ is an aliphatic hydrocarbon having up to 7 carbon atoms, and $R_2$ is either hydrogen or an aliphatic hydrocarbon having up to 7 carbon atoms;
   (b) a desiccant component comprising a granular silica gel having a particle size between about 2 $\mu$m and about 8 $\mu$m and upon whose surface the inhibitor component is deposited to thereby produce a vapor phase corrosion inhibitor-desiccant formulation; and
   (c) a substrate wherein the inhibitor-desiccant formulation is retained.

7. A vapor phase corrosion inhibitor-desiccant formulation and substrate composite as claimed in claim 6 wherein the substrate comprises an aliphatic hydrocarbon film selected from the group consisting of polyethylene and polypropylene, and wherein said anhydrous amine molybdate is retained within the substrate by extrusion therewith.

8. A vapor phase corrosion inhibitor-desiccant formulation and substrate composite as claimed in claim 6 wherein the substrate comprises a foam.

9. A vapor phase corrosion inhibitor-desiccant formulation and substrate composite comprising:
   (a) a vapor phase corrosion inhibitor component comprising, by weight, from about 50% to about 97% cyclohexylamine benzoate, from about 1% to about 20% ethylamine benzoate, from about 1% to about 20% dicyclohexylamine nitrate, and from about 1% to about 10% benzotriazole;
   (b) a desiccant component comprising a granular silica gel having a particle size between about 2 μm and about 8 μm and upon whose surface the inhibitor component is deposited to thereby produce a vapor phase corrosion inhibitor-desiccant formulation; and
   (c) a substrate wherein the inhibitor-desiccant formulation is retained.

10. A vapor phase corrosion inhibitor-desiccant formulation and substrate composite as claimed in claim 9 wherein the substrate comprises a foam.

11. A vapor phase corrosion inhibitor-desiccant formulation and substrate composite as claimed in claim 10 wherein the inhibitor-desiccant formulation is present in the range of from about 1% to about 30% by weight.

12. A vapor phase corrosion inhibitor-desiccant formulation and substrate composite as claimed in claim 9 wherein the substrate comprises an aliphatic hydrocarbon film selected from the group consisting of polyethylene and polypropylene, and wherein the inhibitor-desiccant formulation is retained within the substrate by extrusion therewith.

13. A vapor phase corrosion inhibitor-desiccant formulation and substrate composite as claimed in claim 12 wherein the inhibitor-desiccant formulation is present in the range of from about 2% to about 3% by weight.

* * * * *